(12) United States Patent
Wang

(10) Patent No.: US 8,504,024 B2
(45) Date of Patent: Aug. 6, 2013

(54) METHOD FOR IMPLEMENTING AN INTELLIGENT SERVICE AND COMMUNICATIONS SYSTEM

(75) Inventor: Yuyong Wang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/302,904

(22) Filed: Nov. 22, 2011

(65) Prior Publication Data

US 2012/0064888 A1     Mar. 15, 2012

Related U.S. Application Data

(63) Continuation of application No. PCT/CN2010/072965, filed on May 20, 2010.

(30) Foreign Application Priority Data

May 27, 2009    (CN) .......................... 2009 1 0143617

(51) Int. Cl.
*H04W 4/00* (2009.01)
*H04M 7/00* (2006.01)

(52) U.S. Cl.
USPC ......... 455/433; 455/432.1; 370/338; 379/229

(58) Field of Classification Search
USPC ................ 455/432, 435, 445, 433; 370/465, 370/338; 379/201.01, 219; 709/223, 219, 709/244
See application file for complete search history.

(56) References Cited

U.S. PATENT DOCUMENTS

| 5,583,914 | A | * | 12/1996 | Chang et al. ................... 455/466 |
| 5,862,481 | A | * | 1/1999 | Kulkarni et al. ............ 455/432.2 |
| 6,032,043 | A | | 2/2000 | Houde |
| 6,397,255 | B1 | | 5/2002 | Nurenberg et al. |
| 7,660,881 | B2 | * | 2/2010 | Thanh et al. ................... 709/223 |

(Continued)

FOREIGN PATENT DOCUMENTS

| CN | 1238111 A | 12/1999 |
| CN | 1514562 A | 7/2004 |

(Continued)

OTHER PUBLICATIONS

X.S0006-0_v1.0_051218 3GPP2 Version 1.0 Map Support of Authentication and Key Agreement Dated Oct. 2005 Revision X.S0006 (Refer to as 3GPP).*

(Continued)

*Primary Examiner* — Nizar Sivji
(74) *Attorney, Agent, or Firm* — Brinks Hofer Gilson & Lione

(57) ABSTRACT

The present application discloses a method for implementing an intelligent service and a communications system and relates to the communications technology field, so that an intelligent service may be performed in a wireless intelligent network (WIN). The method includes: a home mobile switch center (MSC) receives a call routed by a serving MSC, where the call carries a WIN configuration parameter that a home home location register (HLR) delivers to the serving MSC; after determining, according to the WIN configuration parameter of the serving MSC, that the call is a WIN OVERLAY call, the home MSC obtains an intelligent service parameter through a home first network entity; the home MSC implements WIN intelligent service processing according to the intelligent service parameter. The embodiments of the present invention are mainly applied in a WIN.

20 Claims, 10 Drawing Sheets

U.S. PATENT DOCUMENTS

| | | | |
|---|---|---|---|
| 2003/0095566 A1* | 5/2003 | Bunting et al. | 370/465 |
| 2005/0015251 A1 | 1/2005 | Pi et al. | |
| 2007/0129949 A1 | 6/2007 | Alberth et al. | |
| 2007/0263817 A1 | 11/2007 | Chen et al. | |
| 2010/0144344 A1* | 6/2010 | Jiang | 455/433 |

FOREIGN PATENT DOCUMENTS

| | | | |
|---|---|---|---|
| CN | 1564573 A | 1/2005 | |
| CN | 1756420 A | 4/2006 | |
| CN | 101083781 A | 12/2007 | |
| CN | 101409074 A | 4/2009 | |
| CN | 101568099 A | 10/2009 | |
| CN | 101568099 B | 2/2011 | |

OTHER PUBLICATIONS

International Search Report issued in corresponding PCT Patent Application No. PCT/CN2010/072965, mailed Aug. 26, 2010.

Written Opinion of the International Searching Authority issued in corresponding PCT Patent Application No. PCT/CN2010/072965, mailed Aug. 26, 2010.

* cited by examiner

METHOD FOR IMPLEMENTING AN INTELLIGENT SERVICE AND COMMUNICATIONS SYSTEM

CROSS-REFERENCE TO RELATED APPLICATIONS

This application is a continuation of International Application No. PCT/CN2010/072965, filed on May 20, 2010, which claims priority to Chinese Patent Application No. 200910143617.8, filed on May 27, 2009, both of which are hereby incorporated by reference in their entireties.

FIELD OF THE APPLICATION

The present application relates to the communications technology field, and in particular, to a method for implementing an intelligent service and a communications system.

BACKGROUND OF THE APPLICATION

A wireless intelligent network (WIN) is an intelligent network system based on a code division multiple access (CDMA) mobile communication network and is mainly used to provide users with intelligent services in the CDMA network. A Customized Applications for Mobile Network Enhanced Logic (CAMEL) standard is a mobile intelligent network standard formulated by the European Telecommunications Standards Institute (ETSI), and is mainly used to provide users with intelligent services in a Global System for Mobile Communications (GSM) network.

Different from the CAMEL standard, a WIN standard defines services, service attributes, and service information flows that are supported at each phase according to urgent market service requirements. In addition, entities such as a service control point (SCP) are introduced in the original CDMA network, and a Mobile Application Part (MAP) protocol is used.

However, the following problems are known to exist in these systems:

If an OVERLAY service switching point (OVERLAY SSP) mode is used on the WIN, when an intelligent service is performed, the WIN standard requires that some MAP information should be used as mandatory information elements, however, a relay signaling cannot transfer the MAP information to the OVERLAY SSP. Therefore, the intelligent service may not be performed on the WIN.

SUMMARY OF THE APPLICATION

Embodiments of the present application provide a method for implementing an intelligent service and a communications system, so that an intelligent service can be performed in a wireless intelligent network (WIN).

The embodiments of the present application adopt the following technical solutions:

A method for implementing an intelligent service includes:
receiving, by a home mobile switching center (MSC), a call routed by a serving MSC, where the call carries a WIN configuration parameter that a home home location register (HLR) delivers to the serving MSC;
after determining that the call is a WIN OVERLAY call according to the WIN configuration parameter of the serving MSC, obtaining, by the home MSC, an intelligent service parameter through a home first network entity; and
working, by the home MSC and according to the intelligent service parameter, with the serving MSC, the first network entity, and a home second network entity to implement WIN intelligent service processing.

A communications system includes a home MSC, a home first network entity, and a home second network entity.

The home MSC is configured to: receive a call routed by a serving MSC, where the call carries a WIN configuration parameter that a home HLR delivers to the serving MSC; after determining that the call is a WIN OVERLAY call, obtain an intelligent service parameter through the home first network entity; and work with the serving MSC, the home first network entity, and the home second network entity to implement WIN intelligent service processing.

The home first network entity is configured to send the intelligent service parameter to the home MSC.

The second network entity is configured to work with the home MSC, the home first network entity, and the second network entity to implement the WIN intelligent service processing.

A method for implementing an intelligent service includes:
receiving, by a home HLR, a location request message sent by a home MSC, where the message carries a TRANSCAP (namely, system processing capability of a serving MSC) parameter and a mobile switching center identification number (MSCID) of the serving MSC;
when determining, according to the location request message, that the serving MSC does not have a WIN capability, sending, by the home HLR, a location response message to the home MSC, where the location response message carries an intelligent service parameter and information that is used to indicate that the serving MSC does not have the WIN capability; and
working, by the home MSC and according to the intelligent service parameter, with the serving MSC, the home HLR, and a service control point (SCP) to implement WIN intelligent service processing.

A communications system includes a home MSC, a home HLR, and an SCP.

The home HLR is configured to: receive a location request message sent by the home MSC, where the message carries a TRANSCAP parameter and an MSCID of the serving MSC; when determining, according to the location request message, that the serving MSC does not have a WIN capability, send a location response message to the home MSC, where the location response message carries an intelligent service parameter and information that is used to indicate that the serving MSC does not have the WIN capability.

The home MSC is configured to: receive the location response message, and work, by using the intelligent service parameter, with the home HLR and the SCP to implement WIN intelligent service processing.

The SCP is configured to work with the home HLR and the home MSC to implement the WIN intelligent service processing.

It can be known from the preceding description that by using the method for implementing an intelligent service and the communications system provided in the embodiments of the present application, the home MSC obtains an intelligent service parameter, and communicates with another entity in the network by using the intelligent service parameter. In this way, information elements that comply with the WIN standard may be transmitted between each network entity. Therefore, by using the technical solutions of the present application, in a WIN, when a mobile subscriber roams to a serving MSC that does not support a WIN capability, an intelligent service can still be performed.

DETAILED DESCRIPTION OF THE EMBODIMENTS

The technical solutions in the embodiments are described clearly and completely below with reference to the accompanying drawings. Apparently, the embodiments described below are only part of rather than all of the embodiments. Persons skilled in the art may derive other embodiments from the embodiments without making creative efforts, and all such embodiments shall fall within the protection scope of the claims.

Figure 1:
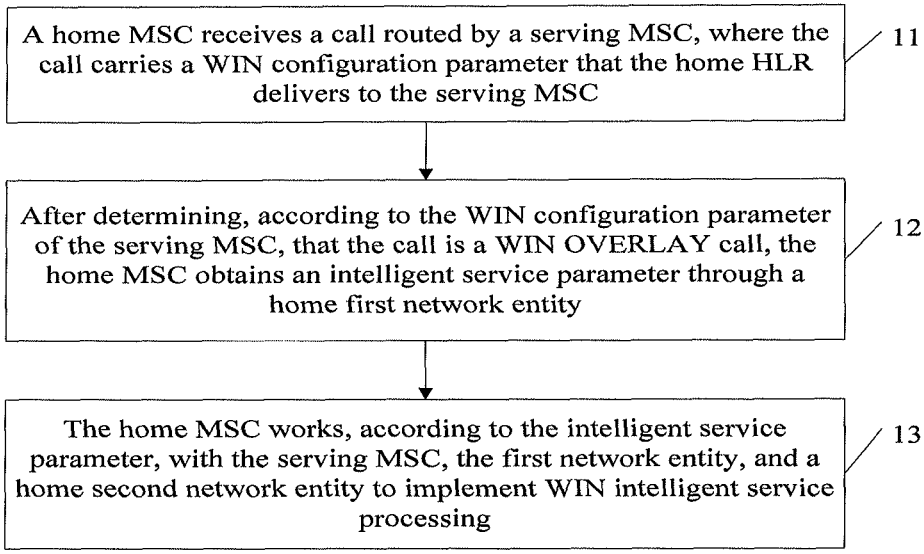
FIG. 1 is a flowchart of a method for implementing an intelligent service according to a first embodiment.

To enable that an intelligent service may be performed in a WIN when a subscriber roams to a serving mobile switch center (MSC) that does not support a WIN capability, a first embodiment provides a method for implementing an intelligent service. As shown in FIG. 1, the method provided in the first embodiment includes the following steps:

Step 11: An MSC of a home network (home MSC for short) receives a call routed by an MSC of a serving network (serving MSC for short), where the call carries a WIN configuration parameter that a home HLR delivers to the serving MSC.

The WIN configuration parameter may include a called party number (CPN), a calling party number (CIN), and an original called number (OCN), or the WIN configuration parameter may include a CPN and a CIN.

Step 12: After determining, according to the WIN configuration parameter of the serving MSC, that the call is a WIN OVERLAY call, the home MSC obtains an intelligent service parameter through a home first network entity.

The intelligent service parameter includes but is not limited to an MSCID of the serving MSC, a mobile station identifier (MSID) of a mobile terminal, and a TRIGADDRLIST (namely, intelligent trigger list) parameter. The MSID includes a mobile identity number (MIN) or international mobile subscriber identification number (IMSI).

Step 13: The home MSC works, according to the intelligent service parameter, with the serving MSC, the home first network entity, and a home second network entity to implement intelligent service processing.

The first network entity may be a home HLR, and the second network entity may be an SCP. Alternatively, the first network entity may be an SCP and the second network entity may be a home HLR.

It can be known from the technical solution provided in the first embodiment that, the home MSC obtains the intelligent service parameter, and communicates with another entity in the network by using the intelligent service parameter. In this way, information elements that comply with the WIN standard may be transmitted between each network entity. Therefore, by using the described technical solution, in a WIN, when a mobile subscriber roams to the serving MSC that does not support the WIN capability, an intelligent service can still be performed.

Figure 2:
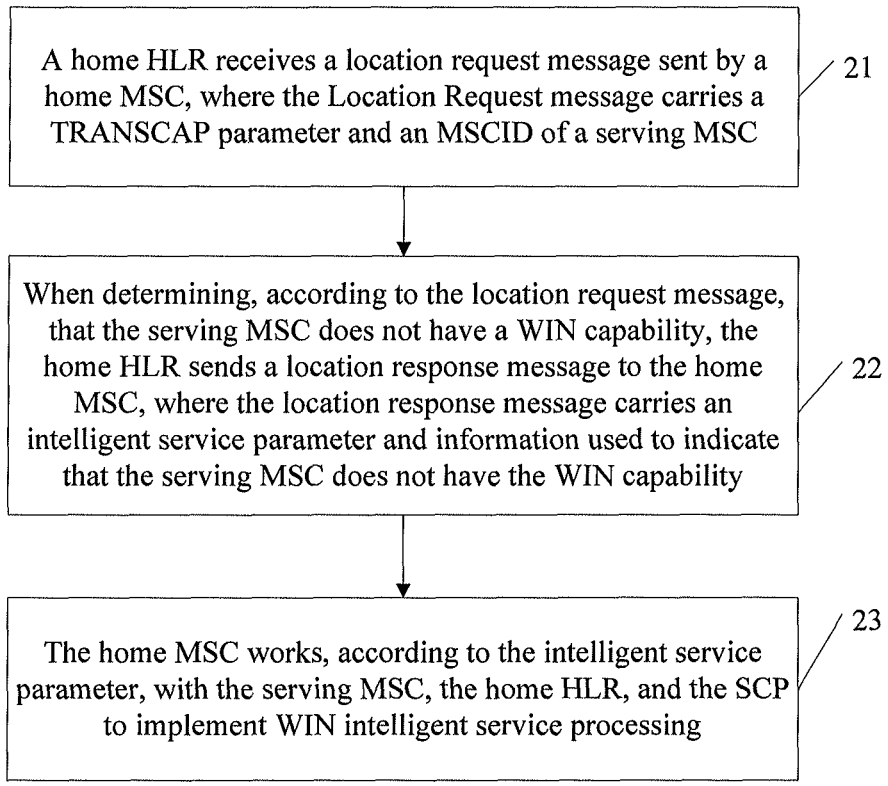
FIG. 2 is a flowchart of a method for implementing an intelligent service according to a second embodiment.

As shown in FIG. 2, a second embodiment also provides a method for implementing an intelligent service, where the method includes the following steps:

Step 21: A home HLR receives a location request message sent by a home MSC, where the message carries a TRANSCAP parameter and an MSCID of the serving MSC.

Step 22: When determining, according to the location request message, that the serving MSC does not have a WIN capability, the home HLR sends a location response message to the home MSC, where the location response message carries an intelligent service parameter and information that is used to indicate that the serving MSC does not have the WIN capability.

The intelligent service parameter is the same as that described in the first embodiment.

Step 23: The home MSC works, according to the intelligent service parameter, with the serving MSC, the home HLR, and the SCP to implement WIN intelligent service processing.

It can be known from the technical solution provided in the second embodiment that, the home MSC obtains an intelligent service parameter, and communicates with another entity in the network by using the intelligent service parameter. In this way, information elements that comply with the WIN standard can be transmitted between each network entity. Therefore, by using the technical solution of the embodiment, in a WIN, when a mobile subscriber roams to the serving MSC that does not support the WIN capability, an intelligent service can still be performed.

The following describes the technical solutions of the first embodiment and the second embodiment with reference to different embodiments.

Figure 3:
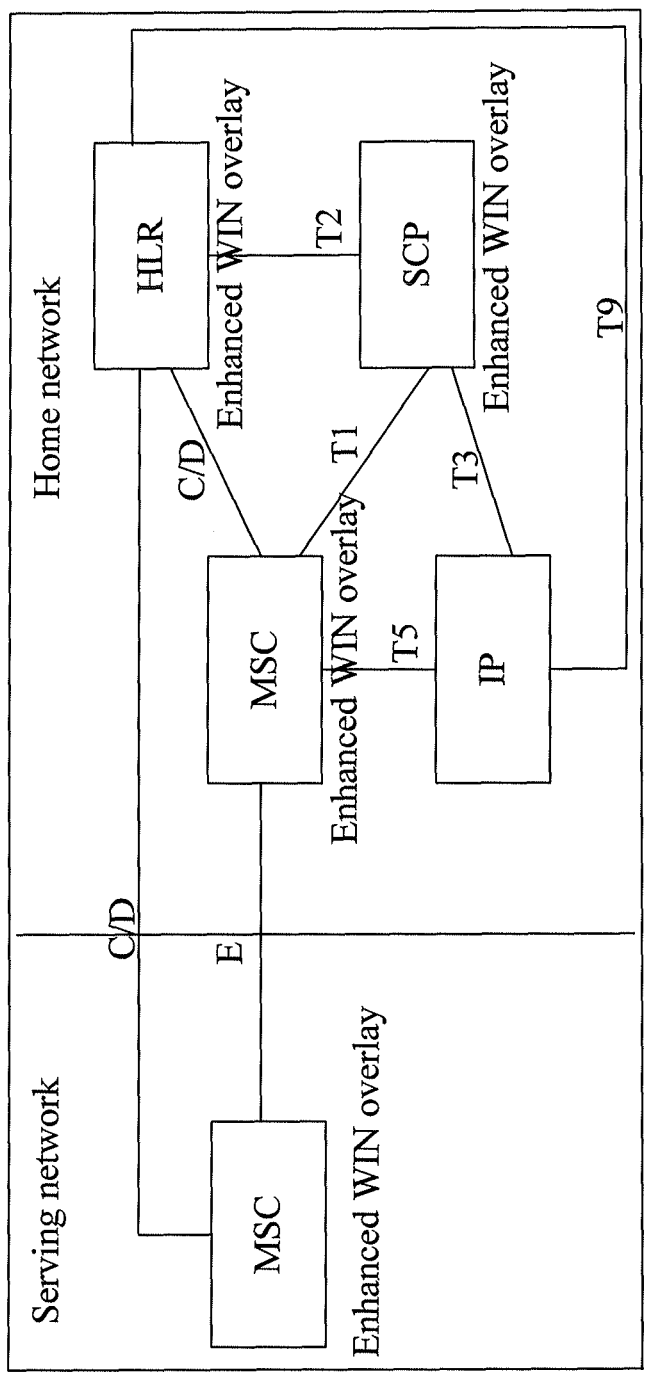
FIG. 3 is a schematic network diagram of a method for implementing an intelligent service according to an embodiment.

Before a technical solution of each embodiment is described, an application scenario for each embodiment is simply described. In an embodiment, a WIN OVERLAY may be formed by improving a current network system. An overlay schematic network diagram is as shown in FIG. 3. As shown in FIG. 3, the WIN OVERLAY includes a serving network and a home network. The serving network includes a serving MSC, and the home network includes entities such as a home HLR, a home MSC, and an SCP. In addition, the serving MSC, home HLR, home MSC, and SCP may be improved according to different application scenarios. However, in a specific application, not all the preceding entities are required to be improved concurrently, but only some entities are improved according to different conditions.

This embodiment provides three application scenarios according to different requirements of the WIN OVERLAY solution for the SCP. Scenario 1: Standard SCP WIN OVERLAY solution. In this scenario, no specific requirement is imposed on the SCP. Scenario 2: Enhanced SCP WIN OVERLAY solution. In this scenario, the SCP needs to be improved accordingly. Scenario 3: WIN OVERLAY solution that fulfills specific conditions. In this scenario, the SCP needs to fulfill specific conditions.

The following describes the embodiments in detail with reference to different scenarios. In the preceding three scenarios, the embodiments may be described in terms of three aspects, namely, a location registration process, an origination process, and a termination process. In addition, the location registration process and the terminating process are implemented in a same way in the preceding three scenarios. Therefore, these two processes are described in detail in one embodiment only, for example, the third embodiment. Furthermore, in the preceding processes, as an example, a signaling connection between the serving MSC and the home MSC is an Integrated Services Digital Network User Part (ISUP). Other relay modes such as a Session Initiation Protocol (SIP) may also be used in the embodiments.

Embodiment 3

Standard SCP WIN OVERLAY Solution

1. Location Registration Process

Figure 4:
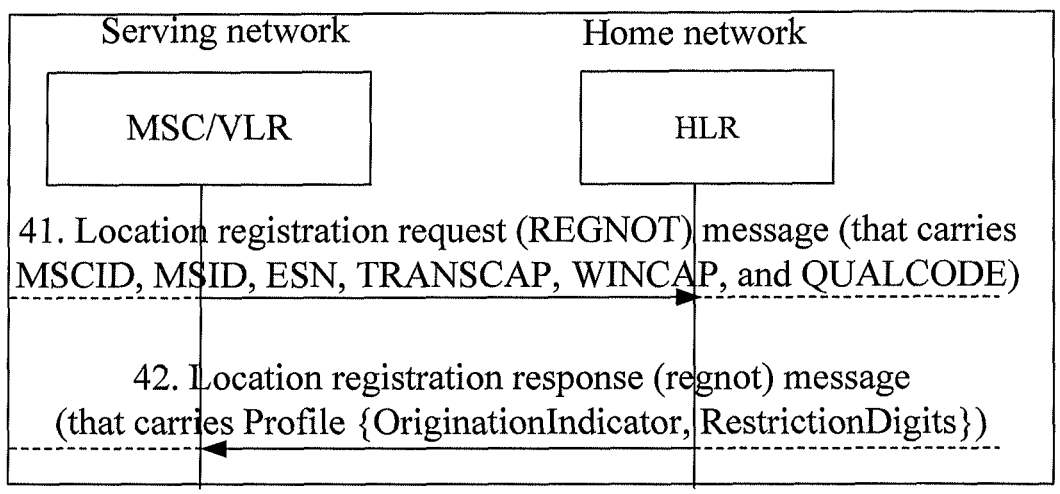
FIG. 4 is a location registration flowchart of a method for implementing an intelligent service according to a third embodiment.

As shown in FIG. 4, the location registration process provided in this embodiment may include the following steps:

Step 41: When finding that a mobile terminal roams to its serving area, a serving MSC/VLR sends a location registration request (REGNOT) message to a home HLR to obtain a profile (namely, a service item list) and authentication information that are of the mobile terminal. The REGNOT message carries parameters such as an MSCID, an MSID, an ESN (electronic serial number of the mobile terminal), a TRANSCAP (system processing capability of the serving MSC), a WINCAP (WIN processing capability of the serving MSC), and QUALCODE (service qualification information applied by the serving MSC).

Step 42: The home HLR authenticates the mobile terminal. After the authentication succeeds and if the mobile terminal subscribes to a WIN trigger, the home HLR determines whether the serving MSC has a WIN capability.

In an actual application, the home HLR may determine whether the serving MSC has the WIN capability according to the TRANSCAP parameter and the MSCID of the serving MSC. Alternatively, the home HLR may determine whether the serving MSC has the WIN capability according to the TRANSCAP parameter, the MSCID of the serving MSC, and the WINCAP parameter.

If the home HLR determines that the serving MSC does not have the WIN capability, the home HLR may deduce that WIN capability configuration information includes OriginationIndicator and RestrictionDigits, and generate a WIN configuration parameter. Then, the home HLR sends the WIN configuration parameter to the serving MSC through a location registration response (regnot) message, and the serving MSC stores the WIN configuration parameter.

In the WIN capability configuration information, both the OriginationIndicator and the RestrictionDigits may be constructed by using the MSCID of the serving MSC and the MSID. In an actual application, it is suggested that a default value of the RestrictionDigits should be 8.

2. Origination Process

Figure 5A:
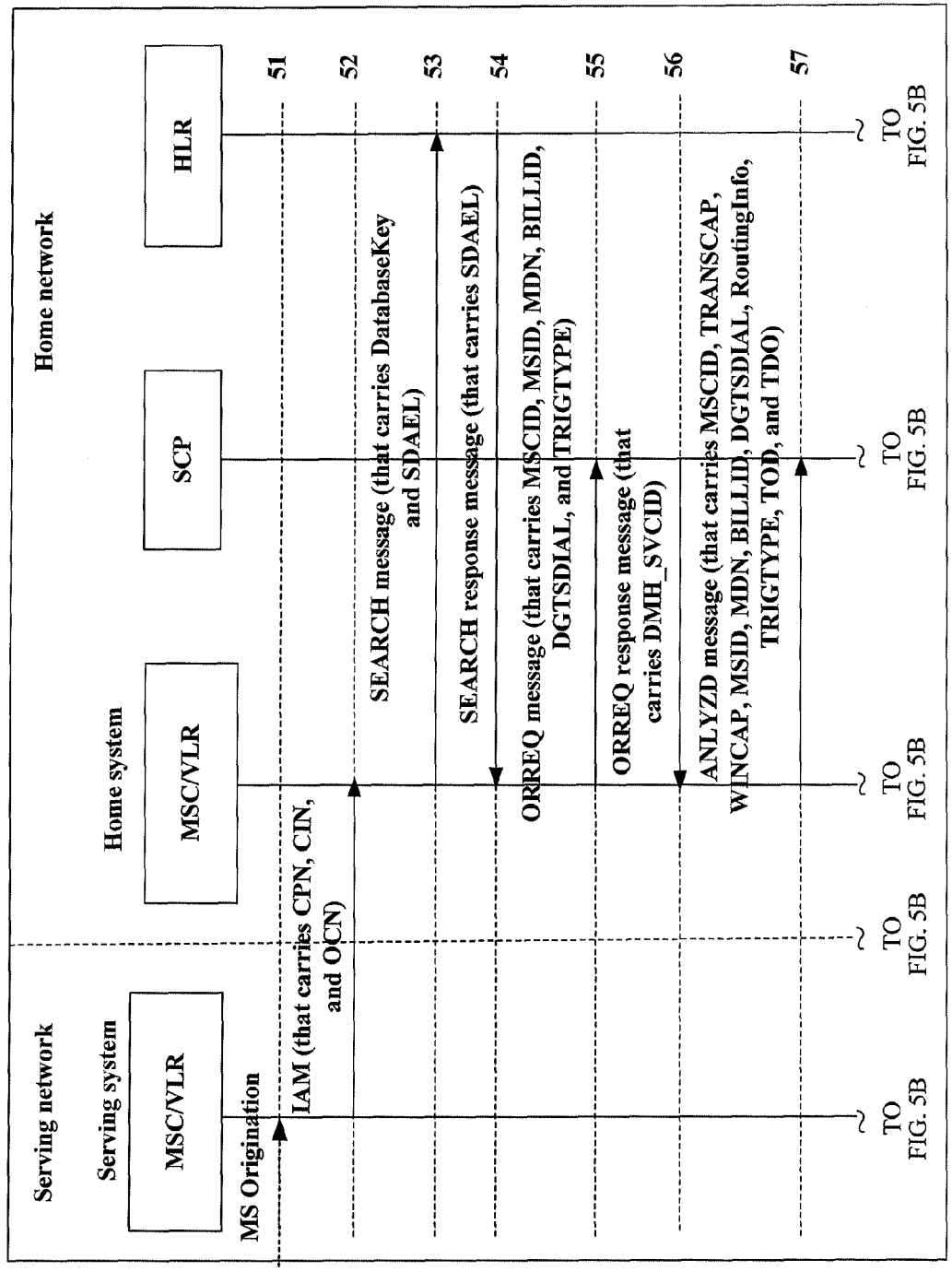
FIG. 5A and FIG. 5B are an origination flowcharts of a method for implementing an intelligent service according to a third embodiment.
Figure 5B:
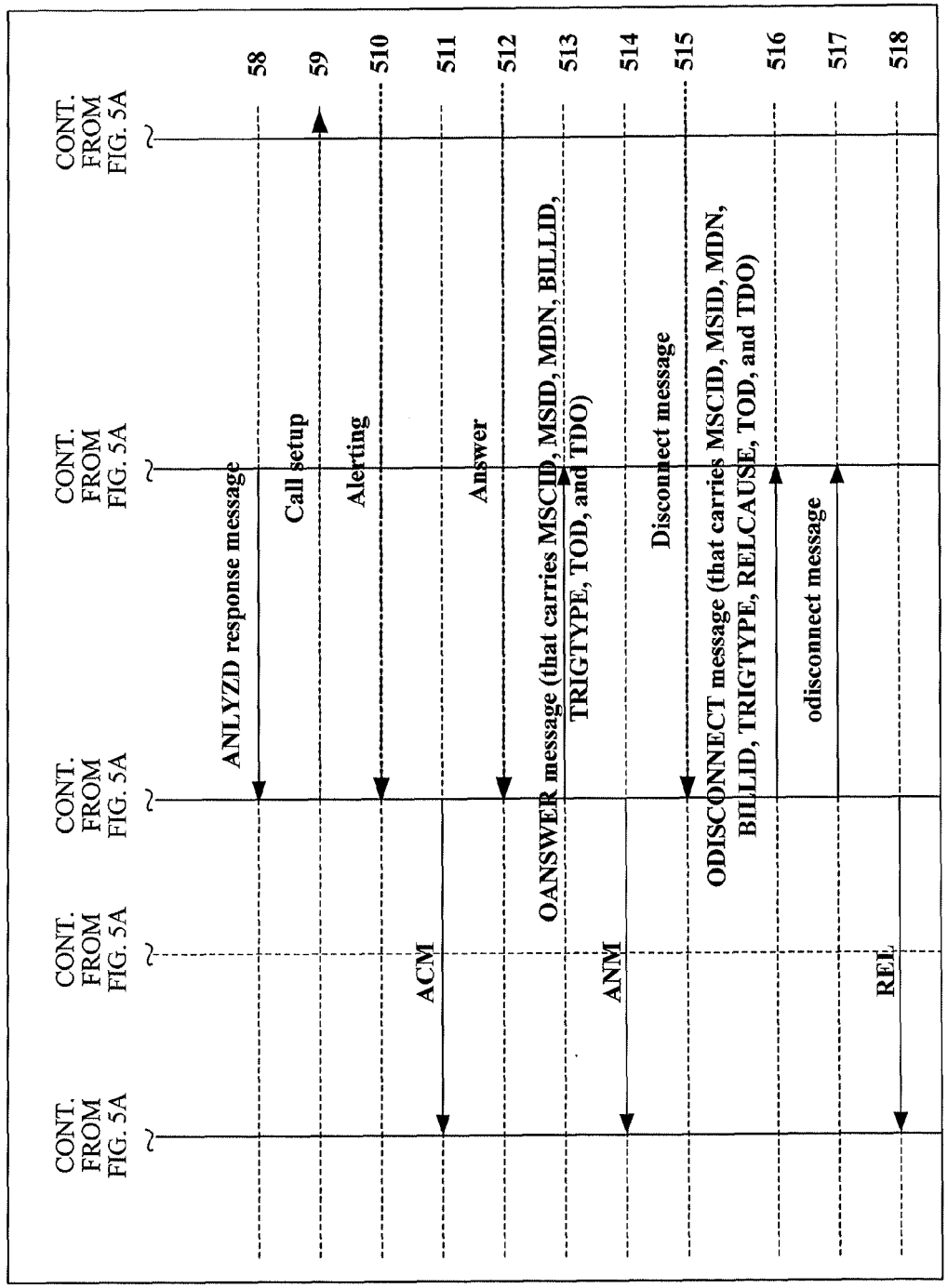

As shown in FIG. 5, the origination process in the scenario provided in the third embodiment may include the following steps:

Step 51: The serving MSC receives an MS Origination call from the mobile terminal.

Step 52: The serving MSC routes the call to a home MSC.

In this step, the serving MSC may route the call to the home MSC by using one of the following two routing modes.

Mode 1: The serving MSC routes the call by using the OriginationIndicator and the RestrictionDigits that are in the WIN capability configuration information.

The serving MSC detects, according to the regnot message, that the profile of the mobile terminal includes the OriginationIndicator and the RestrictionDigits information. Therefore, the serving MSC sends an initial address message (IAM) to the home MSC. In addition, the WIN configuration parameters carried in the IAM and usage of the WIN configuration parameters are as shown in Table 1.

TABLE 1

| Parameters | Usage | Type |
| --- | --- | --- |
| CPN (Called Party Number) | RestrictionDigits in the profile of the mobile terminal | R |
| CIN (Calling Party Number) | Mobile directory number (MDN) of the mobile terminal | R |
| OCN (Original Called Number) | Called number dialed by the mobile terminal | R |

Mode 2: The serving MSC routes the call according to a calling number segment. It should be noted that the second mode is generally applicable to a case that the number segments of intelligent users have rules.

In this mode, the serving MSC sends an IAM to the home MSC, and the WIN configuration parameters carried in the IAM and usage of the WIN configuration parameters are shown in Table 2.

TABLE 2

| Parameters | Usage | Type |
| --- | --- | --- |
| CPN (Called Party Number) | Called number dialed by the mobile terminal | R |
| CIN (Calling Party Number) | MDN of the mobile terminal | R |

Step 53: The home MSC determines, according to the IAM, whether the call is a WIN OVERLAY call. In addition, when determining that the call is a WIN OVERLAY call, the home MSC sends a SEARCH message to the home HLR to obtain related intelligent service parameters and mobile data.

In the first routing mode, the home MSC may determine whether the call is a WIN OVERLAY call according to an OCN parameter and a CPN that are in the IAM. Alternatively, the home MSC may determine whether the call is a WIN OVERLAY call according to the OCN parameter, the CPN, and a CIN parameter. When the CPN or CIN is used, the home MSC may determine, according to configuration of a number segment, whether the call is a WIN OVERLAY call through determining whether the CPN or CIN exists in a locally-configured WIN OVERLAY call origination list and combining the OCN parameter.

In the second routing mode, the home MSC may determine whether the call is a WIN OVERLAY call by using the CIN parameter. Specifically, the home MSC determines whether the call is a WIN OVERLAY call through determining whether the CIN exists in the locally-configured WIN OVERLAY call origination list.

When determining that the call is a WIN OVERLAY call, the home MSC sends a SEARCH message to the home HLR to obtain related intelligent service parameters and mobile data. The parameters carried in the SEARCH message and usage of the parameters are as shown in Table 3.

TABLE 3

| Parameters | Usage | Type |
| --- | --- | --- |
| DatabaseKey | MDN (calling party number) | R |
| SDAEL (ServiceDataAccessElementList) | MIN identifier<br>IMSI identifier<br>MSCID identifier<br>TriggerAddressList Identifier | R |

Step 54: The home HLR sends a search response message to the home MSC. Related parameters carried in the search message and usage of the related parameters are as shown in Table 4.

TABLE 4

| Parameters | Usage | Type |
| --- | --- | --- |
| SDAEL (ServiceDataAccessElementList) | MIN<br>IMSI<br>MSCID: MSCID of the serving MSC<br>TriggerAddressList: registered by the mobile terminal | R |

Then, the home MSC, the home HLR, an SCP, and the serving MSC process an intelligent service in the WIN OVERLAY. The specific process includes the following steps:

Step 55: The home MSC sends an ORREQ message to the SCP, where the ORREQ message carries information such as the MSCID and the MSID.

Step 56: The SCP sends an orreq message to the home MSC.

Step 57: The home MSC sends an ANLYZD message to the SCP, where the ANLYZD message carries information such as the MSCID, the TRANSCA, and the MSID.

Step 58: The SCP sends an anlyzd response message to the home MSC.

Steps 59 to 513: The home MSC, the SCP, the home HLR, and the serving MSC complete the call setup process.

Steps 514 to 518: When a user hangs up, the home MSC, the SCP, the home HLR, and the serving MSC complete a disconnection process. Then, the entire call process ends.

It can be known from the foregoing process that, the specific implementation methods in steps 55 to 518 comply with the WIN standard and an I TU/ANSI ISUP procedure. It should be noted that when communication occurs between the foregoing each entity, the MSCID and the MSID that are used by the home MSC is returned by the home HLR to the home MSC through the search message.

3. Termination Process

Figure 6A:
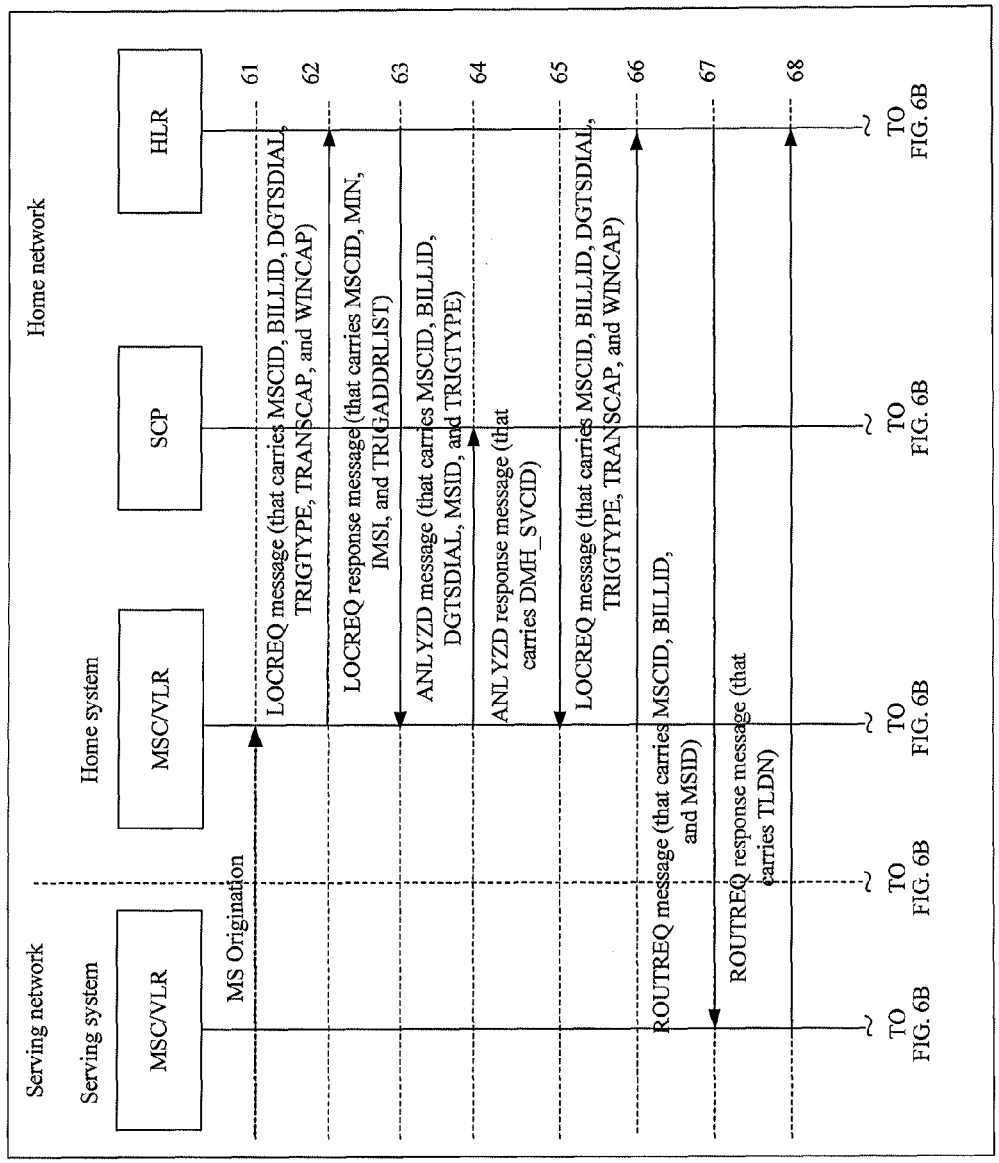
FIG. 6A and FIG. 6B are a termination flowcharts of a method for implementing an intelligent service according to a third embodiment.
Figure 6B:
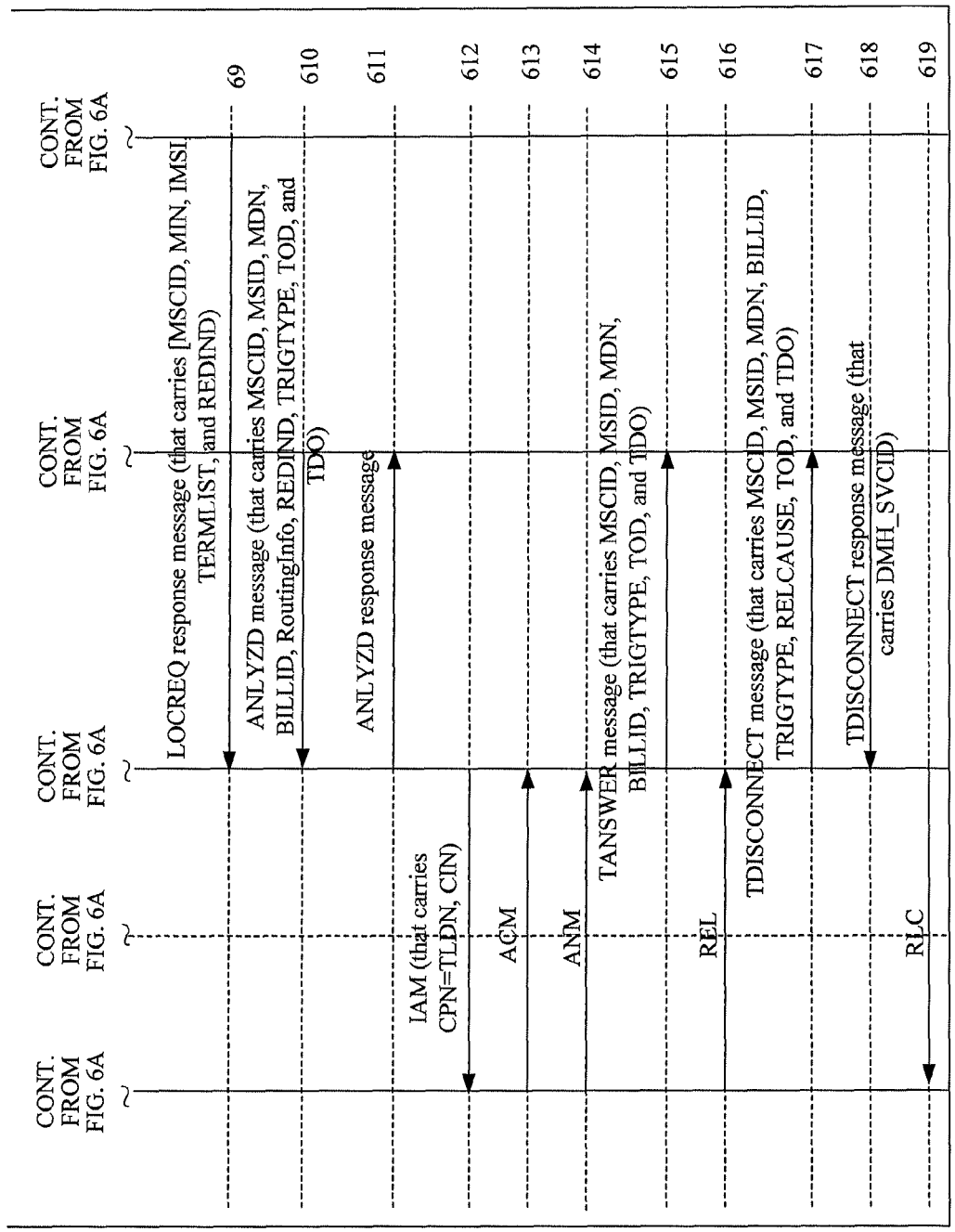

As shown in FIG. 6, the termination process in the scenario provided in the third embodiment may include the following steps:

Step 61: The home MSC receives a call from the mobile terminal.

Step 62: The home MSC detects a Mobile Termination trigger of the mobile terminal, and sends a location request (LOCREQ) message to the home HLR, where the LOCREQ message carries parameters such as an MSCID, a BILLID (charging ID), DGTSDIAL (original called party number), a TRIGTYPE (triggered trigger type), a TRANSCAP, and a WINCAP.

Step 63: The home HLR determines, according to the description in the location registration process, that the serving MSC of the mobile terminal does not have the WIN capability, and sends a location request response (locreq) message to the home MSC. In the locreq response message, the TRIGADDRLIST (an intelligent trigger list) parameter carries an Initial_Termination, a Location, a Called_Routing_Address_Available, a T_Answer, and a T_Disconnect trigger.

The two intelligent service parameters T_Answer and T_Disconnect are carried to indicate that the serving MSC does not have the WIN capability.

Step 64: The home MSC sends an ANLYZD message to the SCP, where the ANLYZD message carries parameters such as an MSCID, a BILLID (charging ID), a DGTSDIAL (original called party number), and a TRIGTYPE.

Step 65: The SCP sends an anlyzd response message to the home MSC.

Step 66: The home MSC sends a LOCREQ message to the home HLR, where the LOCREQ message carries parameters such as an MSCID, a BILLID (charging ID), a DGTSDIAL (original called party number), a TRIGTYPE, a TRANSCAP, and a WINCAP.

Steps 64 to 66 comply with procedures in the WIN standard and ISUP.

Step 67: The home HLR sends a route request (ROUTREQ) message to the serving MSC after determining, according to the LOCREQ message, that the call process may be continued. It should be noted that the ROUTREQ message does not carry the TRIGADDRLIST parameter because the serving MSC does not have the WIN capability.

Steps 68 to 614: The serving MSC, the home MSC, the home HLR, and the SCP perform information interaction. These steps comply with the procedures in the WIN standard and ISUP.

Step 615: The home MSC detects the T_Answer trigger, and sends a TANSWER message to the SCP. The TANSWER message carries the MSCID of the serving MSC.

Step 616: The mobile terminal releases the call.

Step 617: The home MSC detects the T_Disconnect trigger, and sends a TDISCONNECT message to the SCP. The TDISCONNECT message carries the MSCID of the serving MSC.

Step 618: The SCP sends a tdisconnect response message to the home MSC.

Step 619: The home MSC sends a Release Complete (RLC) message to the serving MSC.

Steps 618 to 66 comply with procedures in the WIN standard and ISUP.

It can be known from the technical solution provided in the third embodiment that, the home MSC obtains an intelligent service parameter, and communicates with another network entity by using the intelligent service parameter. In this way, information elements that comply with the WIN standard can be transmitted between each network entity. Therefore, by the technical solution of the embodiment, in a WIN, when a mobile subscriber roams to a serving MSC that does not support a WIN capability, an intelligent service can still be performed. In addition, the SCP in the current network can be used in this embodiment to the greatest extent.

Embodiment 4

Enhanced SCP WIN OVERLAY Solution

Figure 7A:
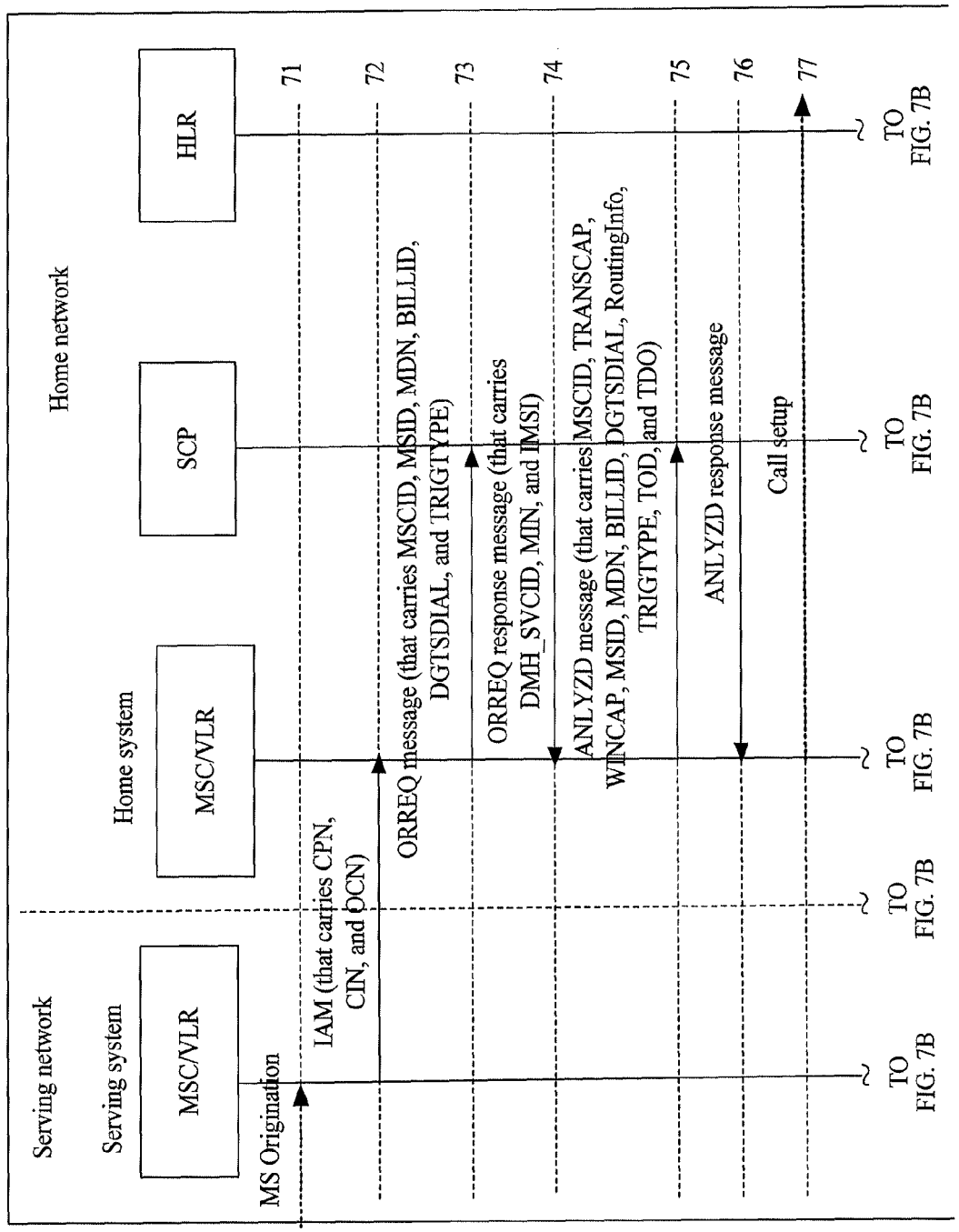
FIG. 7A and FIG. 7B are an origination flowcharts of a method for implementing an intelligent service according to a fourth embodiment.
Figure 7B:
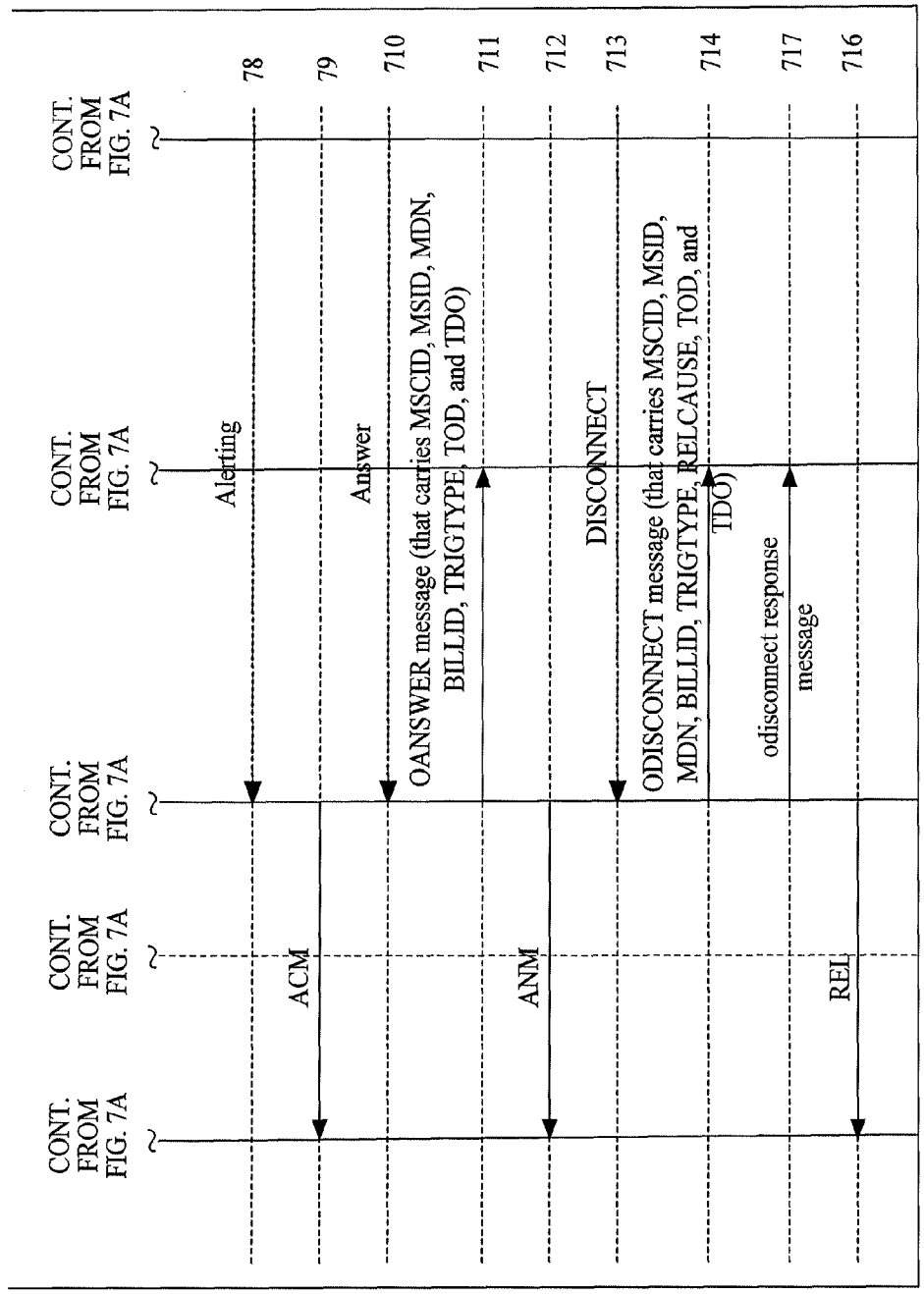

As shown in FIG. 7, an origination process in a scenario provided in the fourth embodiment may include the following steps:

Steps 71 to 72 are the same as steps 51 to 52.

Step 73: A home MSC determines, according to the IAM, whether a call is a WIN OVERLAY call. In addition, after determining that the call is a WIN OVERLAY call, the home MSC sends an ORREQ message to an SCP. The trigger type in the ORREQ message is filled as WIN_OVERLAY_Origination_Attempt_Authorized (namely, WIN OVERLAY origination authorization). Related parameters carried in the ORREQ message and usage of the related parameters are as shown in Table 5.

TABLE 5

| Parameters | Usage | Type |
|---|---|---|
| MSCID | MSCID of the home MSC | R |
| MSID | Set to 0 | R |
| MDN | Calling party number | R |
| DGTSDIAL | Original called party number | R |
| TRIGTYPE | WIN_OVERLAY_Origination_Attempt_Authorized. | R |
| CPSUB (CallingPartySubaddress) | Address information of the serving MSC: (1) Routing mode 1: RestrictionDigits (2) Routing mode 2: deduced according to an incoming trunk group | R |

It can be known from Table 5 that, the home MSC stores location information of the serving MSC by using a CPSUB parameter. In the foregoing first routing mode, the content of the CPSUB is filled as RestrictionDigits; in the foregoing second routing mode, the content of the CPSUB is deduced according to the incoming trunk group.

Step 74: If detecting that the trigger type in the ORREQ message is WIN_OVERLAY_Origination_Attempt_Authorized, the SCP determines that the call is a WIN OVERLAY call. The SCP obtains the CPSUB in the ORREQ message, and deduces a location of the serving MSC. In this case, the SCP neglects a WIN parameter, and performs a subsequent service and bill processing logic by using the MDN and deduced location of the serving MSC.

The SCP sends an orreq response message to the home MSC, and returns a TriggerAddressList parameter subscribed to by a mobile terminal in the orreq response message. Other processing processes are the same as the standard WIN process.

Step 75: The home MSC assembles a TriggerAddressList in the orreq. Other processing processes are the same as the processes in the WIN standard.

Steps 76 to 716: The home MSC, a home HLR, the SCP, and the serving MSC process the intelligent service in the WIN OVERLAY. Steps 76 to 716 comply with the process in the WIN standard and the procedures in the ITU or ANSI ISUP. It should be noted that the MSCID and the MSID that are used by the home MSC are carried in step 73.

It can be known from the technical solution provided in the fourth embodiment that, the home MSC obtains an intelligent service parameter, and communicates with another network entity by using the intelligent service parameter. In this way, information elements that comply with the WIN standard can be transmitted between each network entity. Therefore, by using the described technical solution, in a WIN, when a mobile subscriber roams to a serving MSC that does not support a WIN capability, an intelligent service can still be performed. In addition, in this solution, the improvement on the SCP reduces complexity of improvement on the home MSC.

Embodiment 5

WIN OVERLAY Solution that Fulfils Specific Conditions

In a scenario provided in the fifth embodiment, the origination process may include the following steps:

Steps 81 to 82 are the same as steps 51 to 52.

Step 83: The home MSC determines that the SCP fulfils specific conditions, that is, after a mapping relationship between the MDN and the MSID is stored in the SCP, the following processing is implemented according to different routing methods in step 82:

Processing mode 1: In the foregoing first routing mode, the home MSC deduces the MSCID of the serving MSC according to the CPN (RestrictionDigits), and deduces a TriggerAddressList parameter according to the CPN (RestrictionDigits) and the CIN.

Processing mode 2: In the foregoing second routing mode, the home MSC deduces the MSCID of the serving MSC according to an incoming trunk group, and deduces the TriggerAddressList parameter according to the CPN (RestrictionDigits) and the CIN.

The home MSC sends an ORREQ message to the SCP. Related parameters carried in the ORREQ message and usage of the related parameters are as shown in Table 6.

TABLE 6

| Parameters | Usage | Type |
|---|---|---|
| MSCID | MSCID of the serving MSC | R |
| MSID | MIN (filled with the MDN) | R |
| MDN | Calling party number | R |
| DGTSDIAL | Original called party number | R |

Step 84: The SCP sends, according to the stored mapping relationship between the MDN and the MSID, an orreq message that carries the MSID to the home MSC.

Step 85: The home MSC stores a corresponding MSID, and sends an ANLYZED message to the SCP.

Steps 86 to 816: The home MSC, the home HLR, the SCP, and the serving MSC process an intelligent service in the WIN OVERLAY. Steps 86 to 816 comply with the standard WIN process and the ITU/ANSI ISUP procedures. It should be noted that the MSCID parameter used by the home MSC is filled with MSCID of the serving MSC, and the MSID used by the home MSC is filled with the MSID returned by the SCP.

It can be known from the technical solution provided in the fifth embodiment that, the home MSC obtains an intelligent service parameter, and communicates with another network entity by using the intelligent service parameter. In this way, information elements that comply with the WIN standard can be transmitted between each network entity. Therefore, by using the described technical solution, in a WIN, when a mobile subscriber roams to a serving MSC that does not support a WIN capability, an intelligent service can still be performed. In addition, in this solution, the SCP in the current network can be used to the greatest extent.

It is understandable to those skilled in the art that all or part of the steps in the preceding embodiments may be implemented by relevant hardware instructed by a program. The program may be stored in a computer readable storage medium. When the program is executed, the processes of the preceding methods are executed. The storage medium may be a magnetic disk, a Compact Disk-Read Only Memory (CD-ROM), a Read-Only Memory (ROM) or a Random Access Memory (RAM).

Figure 8:
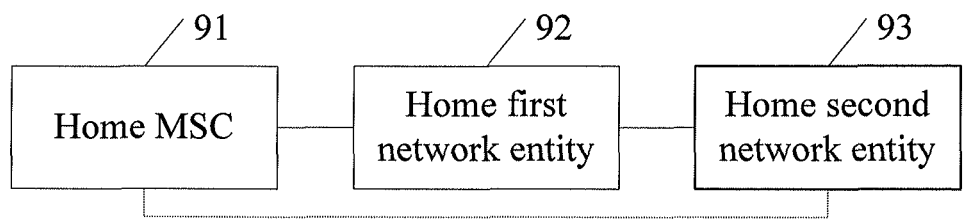
FIG. 8 is a schematic diagram of a communications system according to a sixth embodiment.

As shown in FIG. 8, a sixth embodiment also provides a communications system, including a home MSC 91, a home first network entity 92, and a home second network entity 93.

The home MSC 91 is configured to: receive a call routed by a serving MSC, where the call carries a WIN configuration parameter that a home HLR delivers to the serving MSC; after determining that the call is a WIN OVERLAY call, obtain an intelligent service parameter through a home first network entity; and work with the serving MSC, the home first network entity, and a home second network entity to WIN intelligent service processing.

The home first network entity 92 is configured to send the intelligent service parameter to the home MSC.

The home second network entity 93 is configured to work with the home MSC, the home first network entity, and the second network entity to implement the WIN intelligent service processing.

In an actual application, the home first network entity 92 may be the home HLR, and the home second network entity 93 may be an SCP; or the home first network entity 92 may be the SCP, and the home second network entity 93 may be the home HLR.

The home HLR is further configured to: receive a location registration request message sent by the serving MSC; when determining that the serving MSC does not have a WIN capability, generate a WIN configuration parameter according to the location registration request message, and send the WIN capability configuration information to the serving MSC through a location registration response message.

The process of performing location registration by the HLR is the same as that described in the method embodiments, and is not repeatedly described here.

Figure 9:
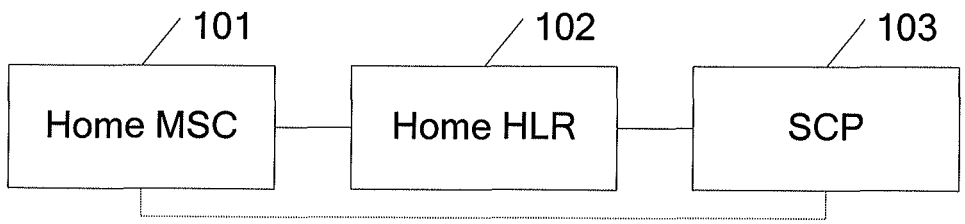
FIG. 9 is a schematic diagram of a communications system according to a seventh embodiment.

Moreover, as shown in FIG. 9, a seventh embodiment also provides a communications system, including a home MSC 101, a home HLR 102, and an SCP 103.

The home HLR 102 is configured to: receive a location request message sent by the home MSC, where the location request message carries a TRANSCAP parameter and an MSCID of the serving MSC; when determining, according to the location request message, that the serving MSC does not have a WIN capability, send a location response message to the home MSC, where the location response message carries an intelligent service parameter and information that is used to indicate that the serving MSC does not have the WIN capability.

The home MSC 101 is configured to: receive the location response message, and work, by using the intelligent service parameter, with the home HLR and the SCP to implement WIN intelligent service processing.

The SCP 103 is configured to work with the home HLR and the home MSC to implement the WIN intelligent service processing.

In conclusion, by using the method for implementing an intelligent service and the communications system provided in the embodiments, the home MSC obtains an intelligent service parameter, and communicates with another network entity by using the intelligent service parameter. In this way, information elements that comply with the WIN standard can be transmitted between each network entity. Therefore, by using the technical solution of the embodiment, in a WIN, when a mobile subscriber roams to a serving MSC that does not support a WIN capability, an intelligent service can still be performed. In addition, by using the embodiments, continuous and consistent intelligent service experience can be provided for final users; an intelligent service platform may be uniformly deployed for carriers without limitations of roaming scenarios.

The preceding descriptions are merely exemplary embodiments, but not intended to limit the protection scope of the claims. Modifications, equivalent replacements, and improvements may be made by those skilled in the art. Such changes are understood to fall within the scope of protection afforded by the claims.

What is claimed is:

1. A method for implementing an intelligent service, comprising:
   receiving, by a home mobile switching center (MSC), a call routed by a serving MSC, wherein the call carries a wireless intelligent network (WIN) configuration parameter that a home home location register (HLR) delivers to the serving MSC;
   determining, according to the WIN configuration parameter of the serving MSC, that the call is a WIN OVERLAY call;
   obtaining, by the home MSC, an intelligent service parameter through a home first network entity; and
   working, by the home MSC and according to the intelligent service parameter, with the serving MSC, the home first network entity, and a home second network entity to implement WIN intelligent service processing.

2. The method of claim 1, wherein before the receiving, by the home MSC, the call routed by the serving MSC, the method further comprises:
   receiving, by the home HLR, a location registration request (REGNOT) message from the serving MSC;
   determining whether the serving MSC has a WIN capability,
   if the MSC does not have the WIN capability, generating, by the home HLR, a WIN configuration parameter according to the REGNOT message; and
   sending the WIN configuration parameter to the serving MSC through a location registration response message.

3. The method of claim 2, wherein the REGNOT message carries at least a TRANSCAP parameter and a mobile switch center identification number (MSCID) of the serving MSC; and the determining, by the home HLR, that the serving MSC does not have the WIN capability comprises:
  determining, by the home HLR and according to the TRANSCAP parameter and the MSCID of the serving MSC, that the serving MSC does not have the WIN capability.

4. The method of claim 1, wherein the receiving, by the home MSC, the call routed by the serving MSC comprises at least one of:
  receiving, by the home MSC, the call that the serving MSC routes through an initial address message (IAM) that carries the WIN configuration parameter, wherein the WIN configuration parameter comprises a called party number (CPN), a calling party number (CIN), and an original called number (OCN); and
  receiving, by the home MSC, the call that the serving MSC routes through the IAM by using a calling number segment, wherein the WIN configuration parameter comprises a CPN and a CIN.

5. The method of claim 2, wherein the receiving, by the home MSC, the call routed by the serving MSC comprises at least one of:
  receiving, by the home MSC, the call that the serving MSC routes through an initial address message (IAM) that carries the WIN configuration parameter, wherein the WIN configuration parameter comprises a called party number (CPN), a calling party number (CIN), and an original called number (OCN); and
  receiving, by the home MSC, the call that the serving MSC routes through the IAM by using a calling number segment, wherein the WIN configuration parameter comprises a CPN and a CIN.

6. The method of claim 5, wherein the determining, according to the WIN configuration parameter of the serving MSC, that the call is the WIN OVERLAY call comprises:
  when the WIN configuration parameter comprises the CPN, the CIN, and the OCN, determining, according to the OCN and the CPN, that the call is the WIN OVERLAY call; or determining, according to the CPN, the CIN, and the OCN, that the call is the WIN OVERLAY call; and
  when the WIN configuration parameter comprises the CPN and the CIN, determining, according to the CIN, that the call is the WIN OVERLAY call.

7. The method of claim 2, wherein the obtaining, by the home MSC, the intelligent service parameter through the home first network entity when the home first network entity is the home HLR and the home second network entity is a service control point (SCP) comprises:
  sending, by the home MSC, a SEARCH message to the home HLR; and
  receiving, by the home MSC, a search response message that comprises the intelligent service parameter and is sent by the home HLR, wherein the intelligent service parameter comprises at least a mobile switch center identification number (MSCID) of the serving MSC, a mobile station identifier (MSID), and an intelligent trigger address list (TRIGADDRLIST) parameter.

8. The method of claim 1, wherein the obtaining, by the home MSC, the intelligent service parameter through the home first network entity when the home first network entity is the home HLR and the home second network entity is a service control point (SCP) comprises:
  sending, by the home MSC, a SEARCH message to the home HLR; and
  receiving, by the home MSC, a search response message that comprises the intelligent service parameter and is sent by the home HLR, wherein the intelligent service parameter comprises at least a mobile switch center identification number (MSCID) of the serving MSC, a mobile station identifier (MSID), and an intelligent trigger address list (TRIGADDRLIST) parameter.

9. The method of claim 1, wherein the obtaining, by the home MSC, the intelligent service parameter through the home first network entity when the home first network entity is a service control point (SCP) and the home second network entity is the home HLR comprises:
  sending, by the home MSC, an ORREQ message to the SCP, wherein the ORREQ message carries indication information indicating that the call is a WIN OVERLAY call, location information of the serving MSC, and the CIN, so that the SCP can obtain the location information of the serving MSC and perform charging processing according to the location information and the CIN; and
  receiving, by the home MSC, an ORREQ response message from the SCP; and
  obtaining an intelligent service parameter that comprises a TRIGADDRLIST parameter.

10. The method of claim 6, wherein the obtaining, by the home MSC, the intelligent service parameter through the home first network entity when the home first network entity is a service control point (SCP) and the home second network entity is the home HLR comprises:
  sending, by the home MSC, an ORREQ message to the SCP, wherein the ORREQ message carries indication information indicating that the call is a WIN OVERLAY call, location information of the serving MSC, and the CIN, so that the SCP can obtain the location information of the serving MSC and perform charging processing according to the location information and the CIN; and
  receiving, by the home MSC, an ORREQ response message from the SCP; and
  obtaining an intelligent service parameter that comprises a TRIGADDRLIST parameter.

11. The method of claim 10, further comprising:
  storing, by the home MSC, the TRIGADDRLIST parameter.

12. The method of claim 6, wherein before the obtaining, by the home MSC, the intelligent service parameter through the home first network entity when the home first network entity is a service control point (SCP) and the second network entity is the home HLR, the method further comprises:
  determining, by the home MSC, that the SCP stores a mapping relationship between a mobile directory number (MDN) and a mobile station identifier (MSID); and
  obtaining, by the home MSC, a mobile switch center identification number (MSCID) of the serving MSC and a TRIGADDRLIST parameter according to the WIN configuration parameter.

13. The method of claim 12, wherein the obtaining, by the home MSC, an intelligent service parameter through the home first network entity comprises:
  sending, by the home MSC, an ORREQ message that carries the MDN to the SCP, so that the SCP obtains an MSID corresponding to the MDN according to the stored mapping relationship between the MDN and the MSID; and
  receiving, by the home MSC, an orreq response message; and
  obtaining an intelligent service parameter that comprises the MSID.

14. A communications system, comprising:
a home mobile switch center (MSC);
a home first network entity; and
a home second network entity, wherein the home MSC is configured to:
   receive a call routed by a serving MSC, wherein the call carries a wireless intelligent network (WIN) configuration parameter that a home home location register (HLR) delivers to the serving MSC;
   determining whether the call is a WIN OVERLAY call;
   if the call is a WIN OVERLAY CALL, obtain an intelligent service parameter through the home first network entity; and
   work with the serving MSC, the home first network entity, and the home second network entity to implement WIN intelligent service processing;
   wherein the home first network entity is configured to send an intelligent service parameter to the home MSC; and
   wherein the home second network entity is configured to work with the home MSC and the home first network entity to implement the WIN intelligent service processing.

15. The system of claim 14, wherein the home first network entity is the home HLR and the home second network entity is a service control point (SCP), or the home first network entity is the SCP and the home second network entity is the home HLR, wherein:
   the home HLR is further configured to:
      receive a location registration request (REGNOT) message sent by the serving MSC;
      determine whether the serving MSC has a WIN capability; and
      if the serving MSC does not have a WIN capability, generate a WIN configuration parameter according to the REGNOT message, and send the WIN configuration information to the serving MSC through a location registration response message.

16. A mobile switching center (MSC), configured to:
   receive a call routed by a serving MSC, wherein the call carries a wireless intelligent network (WIN) configuration parameter that a home home location register (HLR) delivers to the serving MSC;
   determining, according to the WIN configuration parameter of the serving MSC, whether the call is a WIN OVERLAY call;
   if the call is a WIN OVERLAY CALL, obtain, by the home MSC, an intelligent service parameter through a home first network entity; and
   work, according to the intelligent service parameter, with the serving MSC, the home first network entity, and a home second network entity to implement WIN intelligent service processing.

17. The mobile switching center according to claim 16, wherein the mobile switching center is further configured to:
   receive a location registration request (REGNOT) message from the serving MSC; and
   determine whether the serving MSC has a WIN capability;
   if the service MSC does not have a WIN capability generate, by the home HLR, a WIN configuration parameter according to the REGNOT message and send the WIN configuration parameter to the serving MSC through a location registration response message.

18. The mobile switching center according to claim 16, wherein the mobile switching center is further configured to:
   receive the call that the serving MSC routes through an initial address message (JAM) that carries the WIN configuration parameter, wherein the WIN configuration parameter comprises a called party number (CPN), a calling party number (CIN), and an original called number (OCN); or
   receive the call that the serving MSC routes through the IAM by using a calling number segment, wherein the WIN configuration parameter comprises a CPN and a CIN.

19. The mobile switching center according to claim 16, wherein when the home first network entity is the home HLR and the home second network entity is a service control point (SCP), the MSC is further configured to:
   send a SEARCH message to the home HLR; and
   receive a search response message which comprises the intelligent service parameter from the home HLR, wherein the intelligent service parameter comprises at least a mobile switch center identification number (MSCID) of the serving MSC, a mobile station identifier (MSID), and an intelligent trigger address list (TRIGADDRLIST) parameter.

20. The mobile switching center according to claim 16, wherein when the home first network entity is a service control point (SCP) and the home second network entity is the home HLR, the MSC is further configured to:
   send an ORREQ message to the SCP, wherein the ORREQ message carries indication information indicating that the call is a WIN OVERLAY call, location information of the serving MSC, and the CIN, so that the SCP can obtain the location information of the serving MSC and perform charging processing according to the location information and the CIN; and
   receive an orreq response message from the SCP, and obtain an intelligent service parameter that comprises a TRIGADDRLIST parameter.

\* \* \* \* \*